United States Patent
Mochizuki et al.

(10) Patent No.: US 6,615,873 B2
(45) Date of Patent: Sep. 9, 2003

(54) CHOKE VALVE FOR AUTOMATIC TRANSMISSION

(75) Inventors: Tetsuya Mochizuki, Wako (JP); Toshiaki Maeda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,973

(22) Filed: Sep. 6, 2001

(65) Prior Publication Data
US 2002/0035007 A1 Mar. 21, 2002

(30) Foreign Application Priority Data
Sep. 8, 2000 (JP) ........................................ 2000-273250

(51) Int. Cl.[7] ................................................ F15D 1/02
(52) U.S. Cl. .............................. 138/42; 138/40; 138/43
(58) Field of Search ............................. 138/42, 40, 43

(56) References Cited

U.S. PATENT DOCUMENTS

| | | | | |
|---|---|---|---|---|
| 3,381,698 A | * | 5/1968 | Hayner et al. | 138/40 |
| 3,515,161 A | * | 6/1970 | Kent | 137/625.6 |
| 3,556,155 A | * | 1/1971 | McWilliams et al. | 138/43 |
| 3,566,716 A | * | 3/1971 | Chatterjea | 138/43 |
| 3,592,230 A | * | 7/1971 | Piroutek | 138/43 |
| 3,789,880 A | * | 2/1974 | Armstrong et al. | 138/44 |
| 3,937,108 A | * | 2/1976 | Will | 74/866 |
| 3,964,372 A | * | 6/1976 | Chatterjea | 138/43 |
| 3,978,891 A | * | 9/1976 | Vick | 138/42 |
| 3,995,664 A | * | 12/1976 | Nelson | 138/43 |
| 4,022,384 A | * | 5/1977 | Hoyle et al. | 138/42 |
| 4,069,843 A | * | 1/1978 | Chatterjea | 138/43 |
| 4,108,210 A | * | 8/1978 | Luthe et al. | 138/42 |
| 4,220,173 A | * | 9/1980 | O'Brien | 138/43 |
| 4,348,116 A | * | 9/1982 | Bordas | 138/42 |
| 4,460,129 A | * | 7/1984 | Olson | 138/42 |
| 5,863,129 A | * | 1/1999 | Smith | 138/42 |
| 5,899,564 A | * | 5/1999 | Kinney et al. | 138/43 |

FOREIGN PATENT DOCUMENTS

| | | | |
|---|---|---|---|
| JP | 63-186058 | 8/1988 | |
| SE | 171409 | * 7/1958 | 138/43 |

* cited by examiner

*Primary Examiner*—James Hook
(74) *Attorney, Agent, or Firm*—Armstrong, Westerman & Hattori, LLP

(57) ABSTRACT

A choke valve for an automatic transmission is formed from a valve hole having a circular section that runs through a valve body in its thickness direction and a columnar valve main body that is fitted in the valve hole. The valve main body has a pair of annular channels formed on the outer periphery of the valve main body at opposite ends and a small diameter section formed between the two annular channels, the small diameter section together with the valve hole forming a choke. An inlet port and an outlet port formed between two separator plates and oil channels formed on opposite faces of the valve body communicate with the pair of annular channels, respectively. Thus, the structure of the choke valve for an automatic transmission is simplified, thereby reducing the cost.

3 Claims, 6 Drawing Sheets

CHOKE VALVE FOR AUTOMATIC TRANSMISSION

BACKGROUND OF THE INVENTION

1. Field of the Invention

The present invention relates to a choke valve for an automatic transmission provided within a valve body interposed between two separator plates.

2. Description of the Related Art

An automatic transmission includes hydraulic units such as a hydraulic clutch, a hydraulic brake and a torque converter. Various types of valves that control the operation of these units are each housed within a valve body on either face of which a separator plate is superimposed. By superimposing the separator plates on the opposite faces of the valve body in this way, it is possible to form oil passages between the separator plates and oil channels that are formed on the surface of the valve body. Such a hydraulic control system of an automatic transmission has a choke valve for controlling the flow rate of the oil according to the temperature conditions, as disclosed in Japanese Patent Application Laid-open No. 63-186058.

As shown in FIG. 7, a conventional choke valve 02 provided within a valve body 01 includes a valve hole 03 that opens on an end face of the plate-shaped valve body 01, a valve main body 04 that is fitted in the valve hole 03, and a clip 05 that prevents the valve main body 04 from falling out. Formed in the valve hole 03 are an inlet port 03a, an outlet port 03b and an air release port 03c. The valve main body 04 has a clip channel 04a with which the clip 05 engages and a small diameter section 04b. Formed between the inner periphery of the valve hole 03 and the outer periphery of the small diameter section 04b of the valve main body 04 is an annular choke 06. The inlet port 03a and the outlet port 03b communicate with each other via the choke 06.

With regard to the conventional choke valve 02 shown in FIG. 7, because it is necessary to machine out the inner periphery of the valve hole 03 so as to form the inlet port 03a and the outlet port 03b, the number of machining steps increases. Furthermore, because it is necessary to employ the clip 05 in order to prevent the valve main body 04 from falling out, the number of parts increases.

The present invention has been carried out in view of the above-mentioned circumstances and it is an object of the present invention to reduce the cost by simplifying the structure of a choke valve for an automatic transmission.

SUMMARY OF THE INVENTION

In order to achieve the above-mentioned object, there is proposed a choke valve for an automatic transmission provided within a valve body interposed between two separator plates, wherein the choke valve is formed from a valve hole having a circular cross-section that runs through the valve body in its thickness direction and a columnar valve main body that is fitted in the valve hole, the valve main body having a pair of annular channels formed on the outer periphery of the valve main body at opposite ends and a small diameter section formed between the two annular channels, the small diameter section together with the valve hole forming a choke, and a pair of ports formed between the two separator plates and oil channels formed on opposite faces of the valve body communicate with the pair of annular channels, respectively.

In accordance with the above-mentioned arrangement, because the valve main body is fitted in the valve hole that runs through the valve body in its thickness direction and the valve main body is prevented from falling out by utilizing the separator plates that are superimposed on the valve body, it is unnecessary to employ special means such as a clip to prevent the valve main body from falling out, thus contributing to a reduction in the number of parts and the number of assembly steps. Moreover, because the pair of ports are formed between the two separator plates and the oil channels formed on the opposite faces of the valve body, it is unnecessary to make channels on the inner periphery of the valve hole so as to form the ports, thus reducing the number of machining steps and achieving a reduction in cost.

Furthermore, there is proposed a choke valve for an automatic transmission wherein the valve main body is retained by a step formed on one end of the valve hole.

In accordance with the above-mentioned arrangement, retaining the valve main body by means of the step at one end of the valve hole can prevent the valve main body from falling out when it is provisionally assembled in the valve hole, thus making assembly of the separator plates easy.

BRIEF DESCRIPTION OF THE DRAWINGS

Modes for carrying out the present invention are described below by reference to a preferred exemplary embodiment of the present invention shown in the attached drawings.

FIG. 1 is a schematic diagram showing a four parallel shaft type automatic transmission;

FIG. 2 is a diagram showing the positions of sections A and B of the transmission;

FIG. 3 is a detailed cross-section of section A in FIG. 2;

FIG. 4 is a detailed cross-section of section B in FIG. 2;

FIG. 5 is a magnified cross-section of the essential part of FIG. 3;

FIG. 6 is a view from a line 6—6 in FIG. 5; and

DETAILED DESCRIPTION OF THE PREFERRED EMBODIMENT

Figure 1:
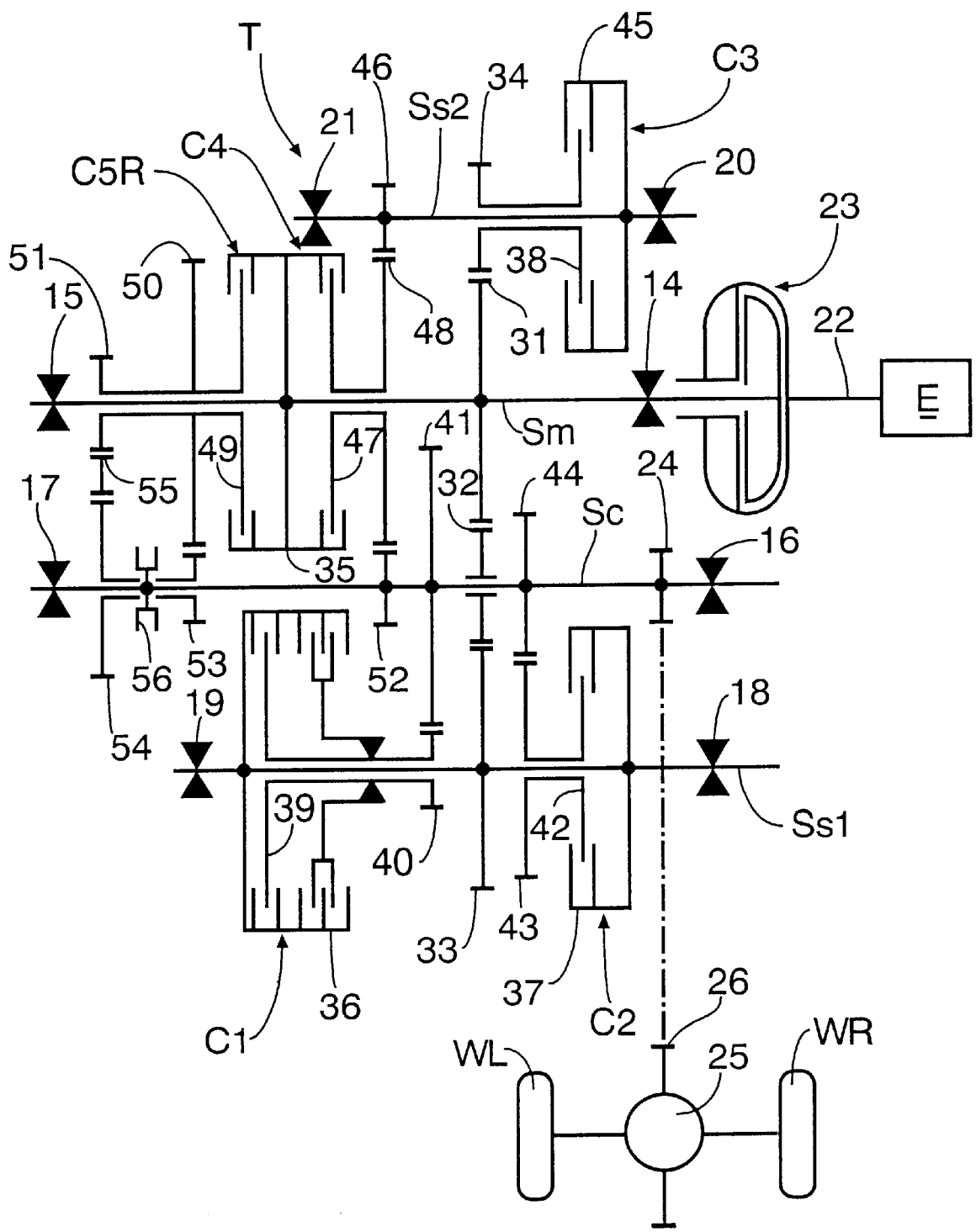
FIGS. 1 to 6 illustrate one embodiment of the present invention, where.
Figure 2:
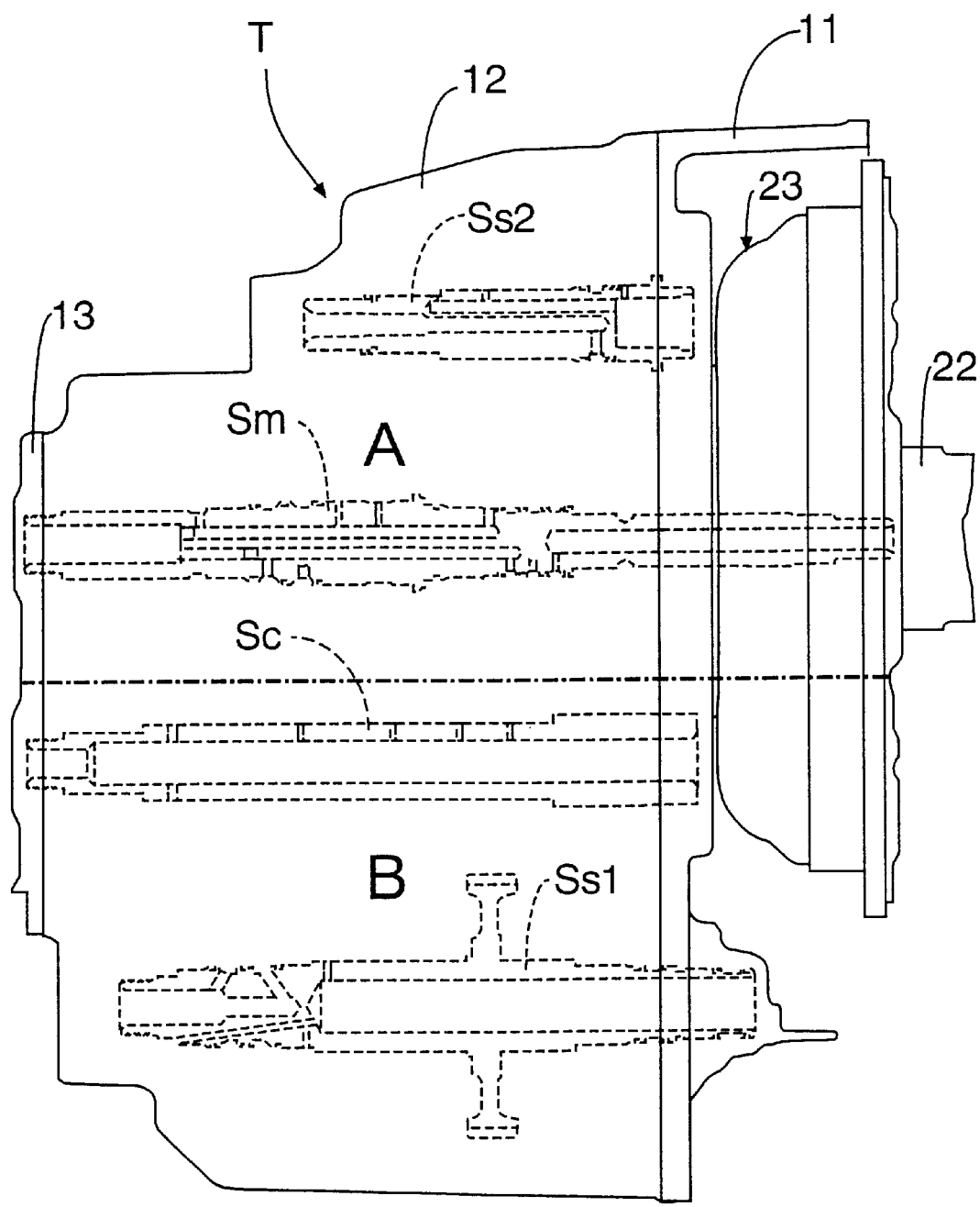
Figure 3:
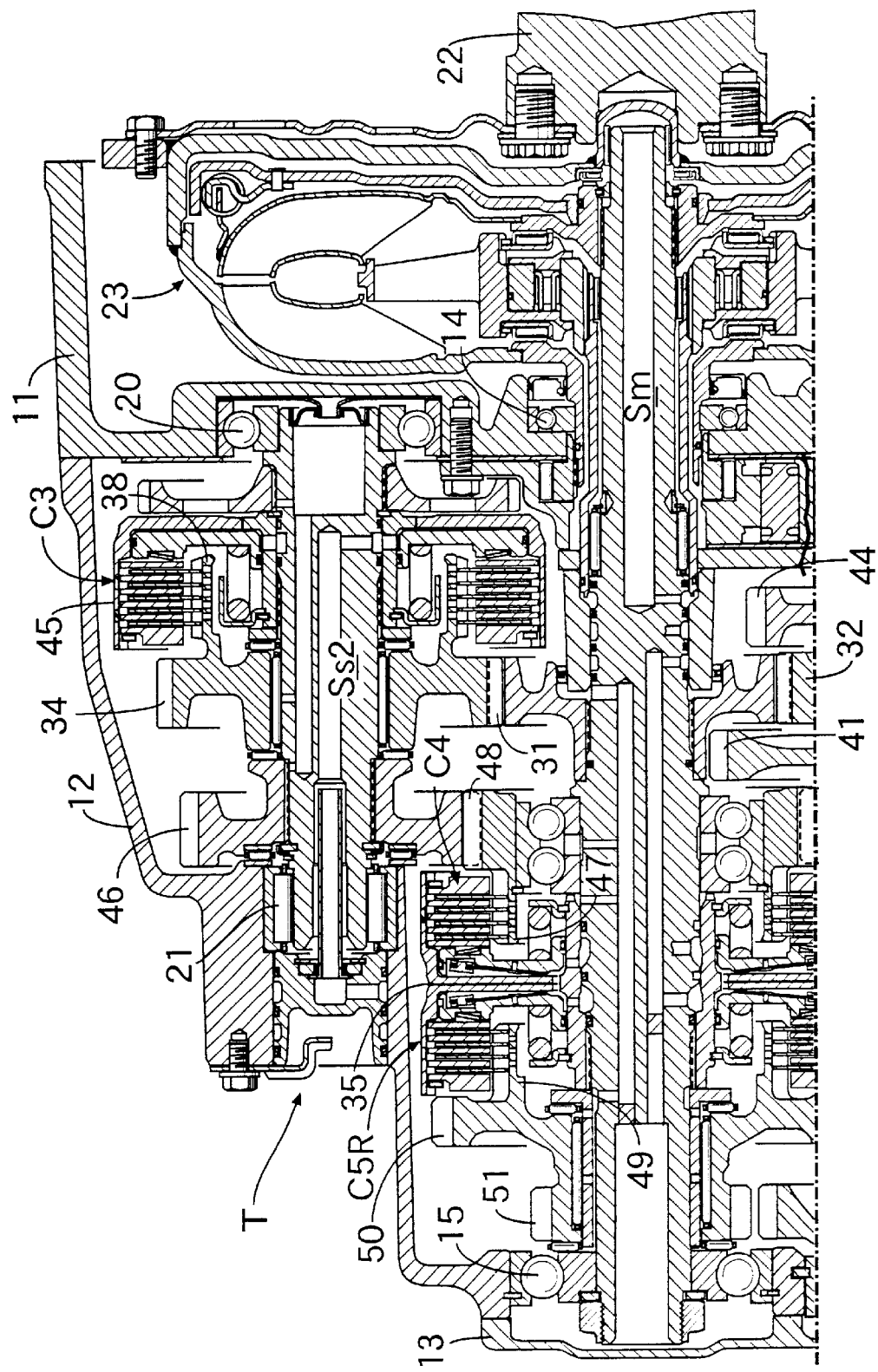
Figure 4:
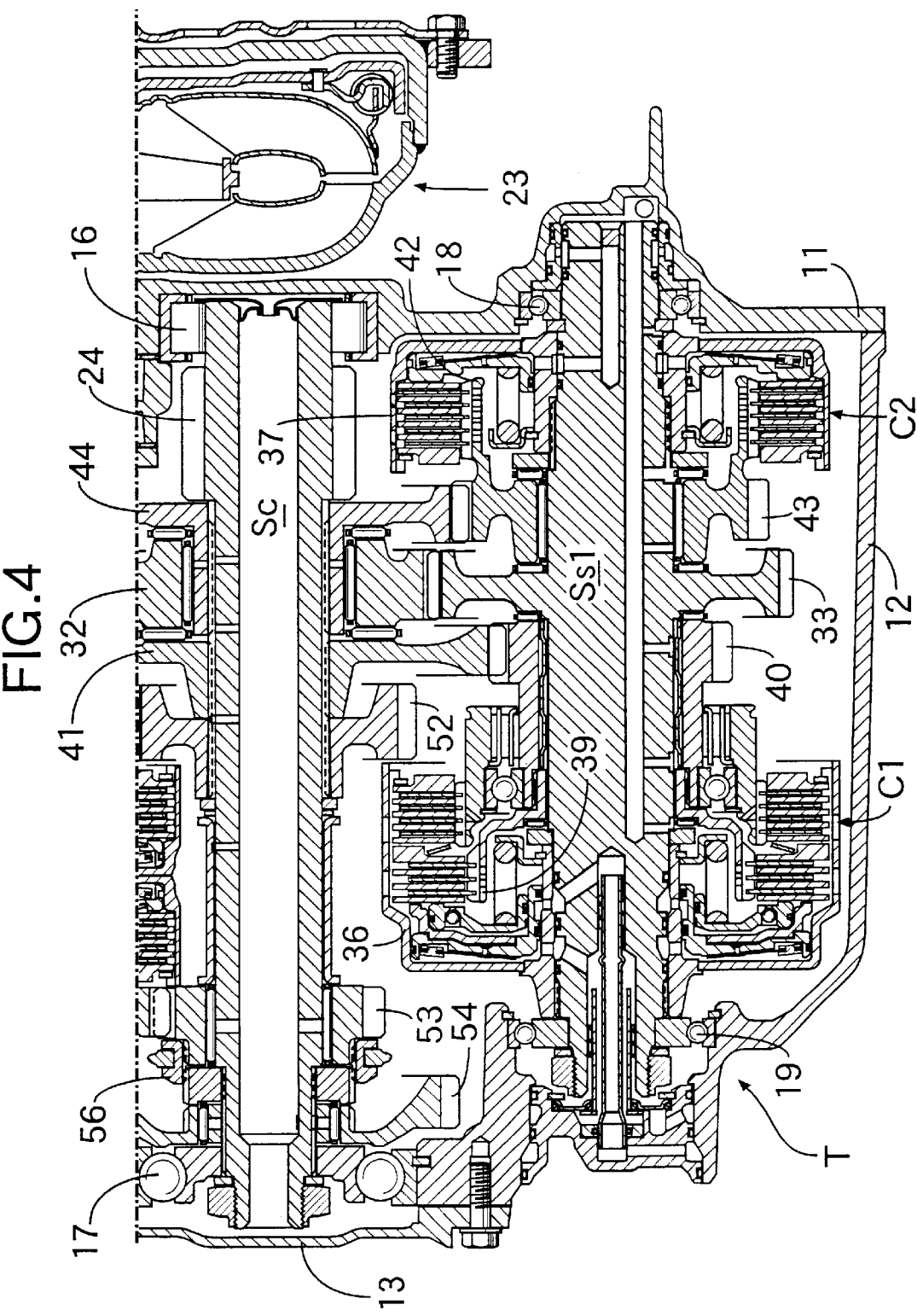

As shown in FIGS. 1 to 4, the outer periphery of a four parallel shaft type automatic transmission T connected to the left-hand side face of an engine E comprises a torque converter case 11, a transmission case 12 and a case cover 13. The torque converter case 11 and the transmission case 12 support a main shaft Sm via ball bearings 14 and 15, a counter shaft Sc via a roller bearing 16 and a ball bearing 17, a first sub-shaft Ss1 via ball bearings 18 and 19, and a second sub-shaft Ss2 via a ball bearing 20 and a roller bearing 21. The main shaft Sm is connected to a crankshaft 22 of the engine E via a torque converter 23. A final drive gear 24 integral with the counter shaft Sc is meshed with a final driven gear 26 fixed on the outer periphery of a differential gear box 25 so as to drive right and left driven wheels WR and WL.

In order to establish a first speed gear shift stage to a fifth speed gear shift stage and a reverse gear shift stage by transmitting the rotation of the main shaft Sm to the counter shaft Sc at the respective gear ratios, a first speed clutch C1 and a second speed clutch C2 are provided on the first sub-shaft Ss1, a third speed clutch C3 is provided on the second sub-shaft Ss2, and a fourth speed clutch C4 and a fifth speed—reverse clutch C5R are provided on the main shaft Sm. A sub-shaft drive first gear 31 integral with the main shaft Sm is meshed with a sub-shaft drive second gear 32 supported on the counter shaft Sc in a relatively rotatable manner. This sub-shaft drive second gear 32 is also meshed with a sub-shaft drive third gear 33 integral with the first sub-shaft Ss1, and the above-mentioned sub-shaft drive first gear 31 is meshed with a sub-shaft drive fourth gear 34 supported on the second sub-shaft Ss2 in a relatively rotatable manner.

Even when the first speed clutch C1 to the fifth speed—reverse clutch C5R are in a disengaged state, each of the parts explained below always rotates as a result of being operable in association with rotation of the main shaft Sm. That is to say, the sub-shaft drive first gear 31 integral with the main shaft Sm and a clutch outer 35 integral with the main shaft Sm, the clutch outer 35 being common to both the fourth speed clutch C4 and the fifth speed—reverse clutch C5R, always rotate, and the sub-shaft drive second gear 32 of the counter shaft Sc that is meshed with the sub-shaft drive first gear 31 of the main sub-shaft Sm always rotates. The first sub-shaft Ss1 having the integral sub-shaft drive third gear 33 meshed with the above-mentioned sub-shaft drive second gear 32 always rotates and the clutch outers 36 and 37 of the first speed clutch C1 and the second speed clutch C2 provided on this first sub-shaft Ss1 also always rotate. The sub-shaft drive fourth gear 34 supported on the second sub-shaft Ss2 in a relatively rotatable manner and meshed with the sub-shaft drive first gear 31, and a clutch inner 38 of the third speed clutch C3 connected integrally to this sub-shaft drive fourth gear 34 also always rotate.

A first sub first speed gear 40 integral with a clutch inner 39 of the first speed clutch C1 provided on the first sub-shaft Ss1 is meshed with a counter first speed gear 41 integral with the counter shaft Sc. A first sub second speed gear 43 integral with a clutch inner 42 of the second speed clutch C2 provided on the first sub-shaft Ss1 is meshed with a counter second speed gear 44 integral with the counter shaft Sc. A clutch outer 45 of the third speed clutch C3 and a second sub third speed gear 46 are integrally provided on the second sub-shaft Ss2. A main third speed—fourth speed gear 48 integral with a clutch inner 47 of the fourth speed clutch C4 provided on the main shaft Sm is meshed with the above-mentioned second sub third speed gear 46 integral with the second sub-shaft Ss2. A main fifth speed gear 50 and a main reverse gear 51 are provided integrally with a clutch inner 49 of the fifth speed—reverse clutch C5R provided on the main shaft Sm.

A counter third speed—fourth speed gear 52 integral with the counter shaft Sc is meshed with the above-mentioned main third speed—fourth speed gear 48. A counter fifth speed gear 53 and a counter reverse gear 54 are supported on the counter shaft Sc in a relatively rotatable manner. The counter fifth speed gear 53 is meshed with the above-mentioned main fifth speed gear 50, and the counter reverse gear 54 is meshed with the above-mentioned main reverse gear 51 via a reverse idle gear 55 (see FIG. 1). The counter fifth speed gear 53 and the counter reverse gear 54 on the counter shaft Sc can be selectively coupled to the counter shaft Sc by means of a chamfer 56.

When the first speed clutch C1 is engaged so as to establish a first speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 36 and the clutch inner 39 of the first speed clutch C1, the first sub first speed gear 40, the counter first speed gear 41, the counter shaft Sc, the final drive gear 24, the final driven gear 26 and the differential gear box 25.

When the second speed clutch C2 is engaged so as to establish a second speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 37 and the clutch inner 42 of the second speed clutch C2, the first sub second speed gear 43, the counter second speed gear 44, the counter shaft Sc, the final drive gear 24, the final driven gear 26 and the differential gear box 25.

When the third speed clutch C3 is engaged so as to establish a third speed gear shift stage, the rotation of the main shaft Sm is transmitted to the driven wheels WR and WL through the sub-shaft drive first gear 31, then the sub-shaft drive fourth gear 34, the clutch inner 38 and the clutch outer 45 of the third speed clutch C3, the second sub-shaft Ss2, the second sub third speed gear 46, the main third speed—fourth speed gear 48, the counter third speed—fourth speed gear 52, the counter shaft Sc, the final drive gear 24, the final driven gear 26 and the differential gear box 25.

When the fourth speed clutch C4 is engaged so as to establish a fourth speed gear shift stage, the rotation of the main shaft Sm is transmitted to the driven wheels WR and WL through the clutch outer 35 and the clutch inner 47 of the fourth speed clutch C4, the main third speed—fourth speed gear 48, the counter third speed—fourth speed gear 52, the counter shaft Sc, the final drive gear 24, the final driven gear 26 and the differential gear box 25.

When the fifth speed—reverse clutch C5R is engaged so as to establish a fifth speed gear shift stage in a state in which the counter fifth speed gear 53 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main fifth speed gear 50, the counter fifth speed gear 53, the counter shaft Sc, the final drive gear 24, the final driven gear 26 and the differential gear box 25.

When the fifth speed—reverse clutch C5R is engaged so as to establish a reverse gear shift stage in a state in which the counter reverse gear 54 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main reverse gear 51, the reverse idle gear 55, the counter reverse gear 54, the counter shaft Sc, the final drive gear 24, the final driven gear 26 and the differential gear box 25.

Figure 5:
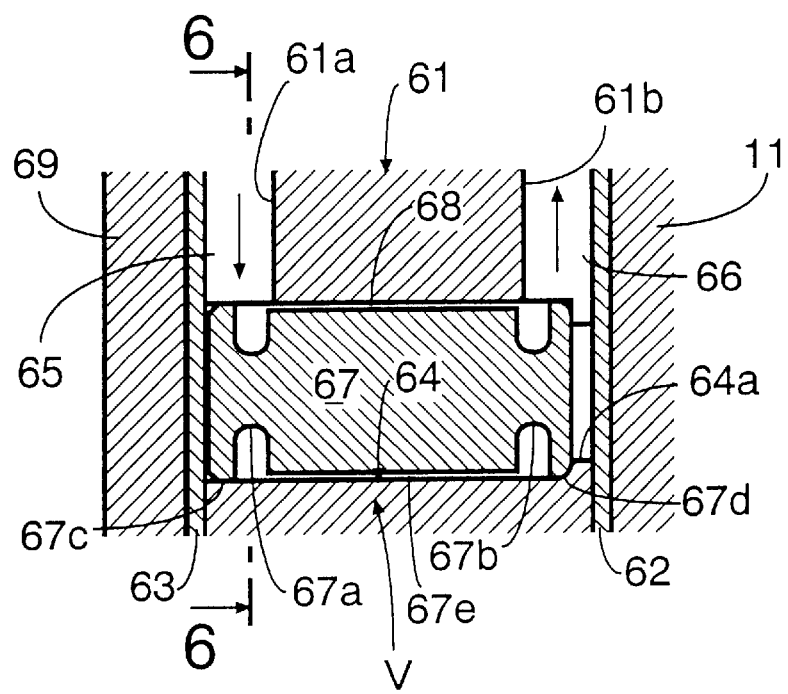
Figure 6:
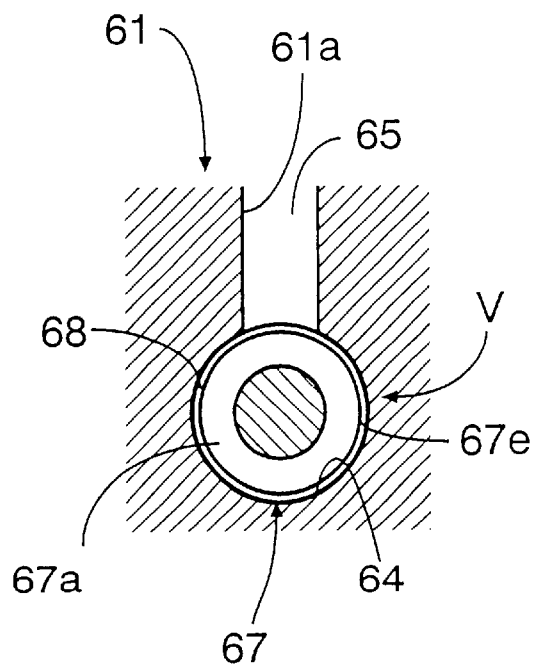
Figure 7:
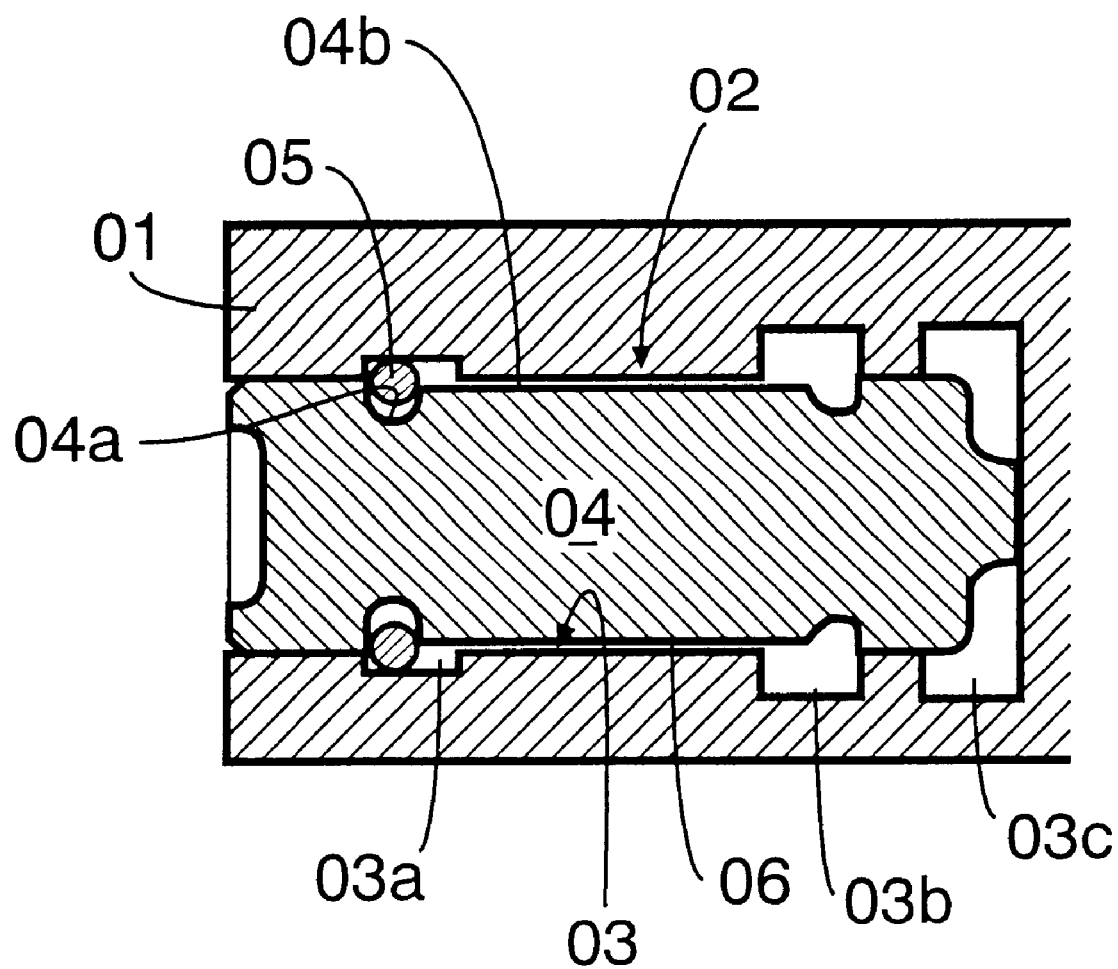
FIG. 7 is a cross-section showing the structure of a conventional choke valve.

As is clear from FIGS. 5 and 6, superimposed on and fixed to the left-hand side face of the torque converter case 11 are a first separator plate 62, a valve body 61, a second separator plate 63 and a cover plate 69. A choke valve V has a valve hole 64 having a circular cross-section that runs through the valve body 61 in its thickness direction. A step 64a is formed on one end of the valve hole 64 that opens on the first separator plate 62 side. When finishing a prepared hole that has been formed during casting of the valve body 61, the above-mentioned valve hole 64 and the step 64a can be formed simultaneously by leaving a part of the prepared hole. Formed on both faces of the valve body 61 are oil channels 61*a* and 61*b* that communicate with the valve hole 64. An inlet port 65 is formed between the oil channel 61*a* and the second separator plate 63 and an outlet port 66 is formed between the oil channel 61*b* and the first separator plate 62.

A columnar valve main body 67 that is fitted in the valve hole 64 has a first annular channel 67*a* and a second annular channel 67*b* near its two ends. Support parts 67*c* and 67*d* having an outer diameter equal to the inner diameter of the valve hole 64 are formed on the two outer sides in the axial direction of the valve main body 67 relative to the first and second annular channels 67*a* and 67*b*. A small diameter section 67*e* having a diameter that is slightly smaller than the inner diameter of the valve hole 64 is formed between the first and second annular channels 67*a* and 67*b*. The first annular channel 67*a* and the second annular channel and 67*b* communicate with the inlet port 65 and the outlet port 66, respectively. The inlet port 65 and the outlet port 66 communicate with each other via an annular choke 68 formed between the valve hole 64 and the small diameter section 67*e*. Since the oil that flows in via the inlet port 65 passes through the choke 68 of the choke valve V and flows out via the outlet port 66, the flow rate of the oil can be controlled according to the temperature conditions.

When assembling the choke valve V, while inserting the valve main body 67 into the valve hole 64 of the valve body 61 and retaining it with the step 64*a,* the first separator plate 62, the second separator plate 63 and the cover plate 69 are superimposed on the two faces of the valve body 61 and the assembly can be fastened to the left-hand side face of the torque converter case 11. Since the valve main body 67 is retained by the step 64*a* of the valve hole 64 so that it does not fall out, the workability can be enhanced. Moreover, since the valve main body 67 is prevented from falling out of the valve hole 64 by the second separator plate 63, it is unnecessary to employ special means to prevent the valve main body from falling out, such as a clip, thus achieving a reduction in the number of parts and the number of assembly steps. Furthermore, since the outlet port 66 and the inlet port 65 are formed between the first and second separator plates 62 and 63 and the oil channels 61*b* and 61*a* formed on the two faces of the valve body 61, respectively, it is unnecessary to make channels on the inner periphery of the valve hole 64 at great cost in time and effort so as to form the ports thus reducing the number of machining steps and achieving a reduction in the cost.

An embodiment of the present invention has been described in detail above, but the present invention can be modified in a variety of ways without departing from the spirit and scope of the invention.

What is claimed is:

1. A choke valve for an automatic transmission, the choke valve being provided in a valve body interposed between two separator plates, comprising:

a valve hole having a circular section that runs through the valve body in its thickness direction, and a columnar valve main body that is fitted in the valve hole, wherein the valve main body has a pair of annular channels formed on an outer peripheral surface of the valve main body around opposite ends and a small diameter section formed between the two annular channels, the small diameter section together with the valve hole forming a choke, and wherein a pair of ports formed between the two separator plates and oil channels formed on opposite faces of the valve body communicate with the pair of annular channels, respectively.

2. The choke valve for an automatic transmission according to claim 1, wherein the valve main body is retained by a step formed on one end of the valve hole.

3. The choke valve for an automatic transmission according to claim 1, wherein said pair of ports are provided to extend perpendicularly to the axis of said columnar valve main body.

* * * * *